(12) United States Patent
Sakuma et al.

(10) Patent No.: US 7,398,555 B2
(45) Date of Patent: Jul. 8, 2008

(54) ELECTRONIC APPARATUS AND MEDIUM

(75) Inventors: Haruhisa Sakuma, Kawasaki (JP);
Naoki Iwasa, Kawasaki (JP); Makoto Kawasaki, Kawasaki (JP); Yoshihisa Harada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 666 days.

(21) Appl. No.: 09/771,689

(22) Filed: Jan. 30, 2001

(65) Prior Publication Data
US 2002/0026593 A1 Feb. 28, 2002

(30) Foreign Application Priority Data
Aug. 28, 2000 (JP) .............................. 2000-257762

(51) Int. Cl.
*G06F 7/04* (2006.01)
(52) U.S. Cl. .............................. 726/27; 726/18; 726/23; 726/26; 726/27; 726/2; 726/28; 726/29; 726/34; 713/183; 340/541
(58) Field of Classification Search ...................... 713/1, 713/200–202, 184–189, 183; 726/26–29, 726/34–36, 2, 18, 23; 340/541
See application file for complete search history.

(56) References Cited

U.S. PATENT DOCUMENTS

| | | | | |
|---|---|---|---|---|
| 4,636,622 A | * | 1/1987 | Clark ........................... | 235/380 |
| 5,850,470 A | * | 12/1998 | Kung et al. .................. | 382/157 |
| 6,072,894 A | * | 6/2000 | Payne ........................... | 382/118 |
| 6,154,879 A | * | 11/2000 | Pare et al. ...................... | 705/35 |
| 6,202,158 B1 | * | 3/2001 | Urano et al. ................. | 713/201 |
| 6,405,318 B1 | * | 6/2002 | Rowland ...................... | 713/200 |
| 7,178,167 B1 | * | 2/2007 | Katoh et al. .................. | 726/26 |
| 2002/0144135 A1 | * | 10/2002 | Langford et al. ............ | 713/200 |
| 2003/0053662 A1 | * | 3/2003 | Evoy et al. ................... | 382/115 |

FOREIGN PATENT DOCUMENTS

| | | |
|---|---|---|
| JP | 7-271482 | 10/1995 |
| JP | 10-222470 | 8/1998 |

OTHER PUBLICATIONS

Cummer, Lawrence, Security gets a Whole new Face, Info World Canada, May 1997 pp. 1-2.*

* cited by examiner

*Primary Examiner*—Kim Vu
*Assistant Examiner*—Beemnet W Dada
(74) *Attorney, Agent, or Firm*—Staas & Halsey LLP

(57) ABSTRACT

Recording peripheral image information by an electronic apparatus only when illegal use of the apparatus is determined to minimize resources and simplifying recording. The electronic apparatus includes a first memory storing a parameter representing at least one condition for the illegal use of the apparatus and a control unit for storing in a second memory image information by a photographing device that photographed a user of the apparatus after the conditions are satisfied. The control unit controls the output of the image information stored in the second memory through an output direction and directs a BIOS setup program to read out the parameter in the first memory and record the image information into the second memory and directs an operating system or an application program running on the apparatus to set and alter the parameter in the first memory via an interface in the BIOS program.

20 Claims, 10 Drawing Sheets

Fig.2

| DATA AREA NAMES | STORAGE PLACE | SIZE |
|---|---|---|
| PARAMETER 1 (RECORDING TIMING)<br>BIT 0: RECORD WHEN THE POWER SUPPLY IS TURNED ON<br>BIT 1: RECORD WHEN THE APPARATUS IS RESUMED<br>BIT 2: RECORD WHEN BIOS SETUP PROGRAM IS ACTIVATED<br>BIT 3: RECORD WHEN AN ILLEGAL PASSWORD IN ENTERED | CMOS RAM | 1 BYTE |
| PARAMETER 2 (FORMAT)<br>NUMBER OF PIXELS/NUMBER OF COLORS, etc. | CMOS RAM | 1 BYTE |
| PARAMETER 3 (WRITING MODE)<br>0: OVERWRITING<br>1: APPENDING | CMOS RAM | 1 BYTE |
| IMAGE DATA MANAGEMENT HEADER<br>POINTER FOR LEADING IMAGE DATA | FLASH MEMORY | 4 BYTES |
| IMAGE DATA<br>POINTER FOR THE NEXT IMAGE DATA<br>TIME WHEN IMAGE DATA IS RECORDED<br>TIMING OF RECORDING IMAGE DATA<br>IMAGE DATA FORMAT<br>DATA | FLASH MEMORY | 4 BYTES<br>8 BYTES<br>1 BYTE<br>1 BYTE<br>n BYTES |

Fig.3A

| FUNCTION: RETURN THE CURRENT SETTING OF IMAGE INFORMATION RECORDING TIMING | |
|---|---|
| WORD (*entryPoint)(Function,Trigger);<br>WORD Function;<br>BYTE *Trigger;<br><br>*Trigger:<br>Bit[7:4]　RESERVE<br>Bit[3]　　0: NO RECORDING HAPPENS WHEN AN ILLEGAL PASSWORD IS ENTERED<br>　　　　　1: RECORDING HAPPENS WHEN AN ILLEGAL PASSWORD IS ENTERED<br>Bit[2]　　0: NO RECORDING HAPPENS WHEN BIOS SETUP PROGRAM IS ACTIVATED<br>　　　　　1: RECORDING HAPPENS WHEN BIOS SETUP PROGRAM IS ACTIVATED<br>Bit[1]　　0: NO RECORDING HAPPENS WHEN THE APPARATUS IS RESUMED<br>　　　　　1: RECORDING HAPPENS WHEN THE APPARATUS IS RESUMED<br>Bit[0]　　0: NO RECORDING HAPPENS WHEN THE POWER SUPPLY IS TURNED ON<br>　　　　　1: RECORDING HAPPENS WHEN THE POWER SUPPLY IS TURNED ON | /*For 32bit Protected Mode*/<br>/*Function 0x0000*/ |
| FUNCTION: SET IMAGE INFORMATION RECORDING TIMING | |
| DITTO | |

Fig.3B

| FUNCTION: RETURN THE CURRENT SETTING OF IMAGE INFORMATION RECORDING FORMAT |
|---|
| WORD (*entryPoint)(Function,Format);  /*For 32bit Protected Mode*/<br>WORD Function;                            /*Function 0x0002*/<br>BYTE *Format;<br><br>*Format:<br>Bit[7:4]    THE NUMBER OF PIXELS<br>          0: 320x240<br>          1: 640x480<br>          2: 1024x768 etc.<br>Bit[3:0]    THE NUMBER OF COLORS<br>          0: 4bit(16)<br>          1: 8bit(256)<br>          2: 16bit(65536)etc. |
| FUNCTION: SET IMAGE INFORMATION RECORDING FORMAT |
| DITTO |

Fig.3C

| FUNCTION: RETURN THE CURRENT SETTING OF IMAGE INFORMATION WRITING MODE | |
|---|---|
| WORD (*entryPoint)(Function,Mode);<br>WORD Function;<br>BYTE *Mode;<br><br>*Mode:<br><br>Bit[7:0]   WRITING MODE<br>            0: OVERWRITING<br>            1: APPENDING | /*For 32bit Protected Mode*/<br>/*Function 0x0004*/ |
| FUNCTION: SET IMAGE INFORMATION WRITING MODE | |
| DITTO | |

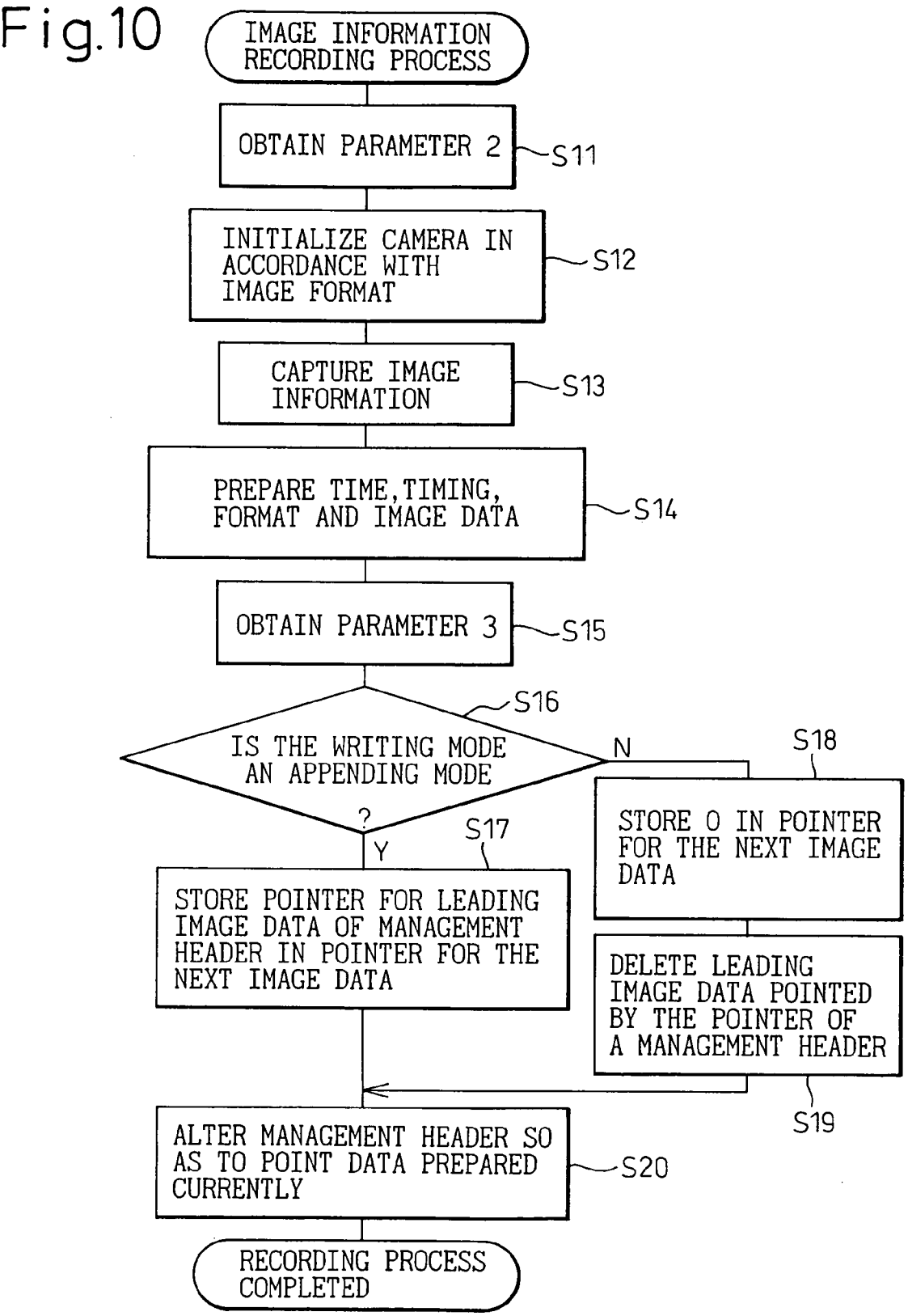

US 7,398,555 B2

ELECTRONIC APPARATUS AND MEDIUM

BACKGROUND OF THE INVENTION

1. Field of the Invention

The present invention relates to an electronic apparatus for identifying a user in the event that the user who is not authorized to do so gains access to the apparatus and a medium having a program therefore recorded thereon, and in particular to an electronic apparatus for recording as an image the peripheral status of a system while the system is in operation and a medium having a program therefore recorded thereon.

2. Description of the Related Art

A protection mechanism against illegal usage is provided on a conventional electronic apparatus such as a personal computer system (hereinafter, referred to as PC system). This protection mechanism is provided on the premise that the system knows who is the user and identifies him or her as an authorized user when he or she logs on the system. The identification of the user is normally carried out by identifying a certain knowledge that the user possesses, a certain thing that the user possesses or a certain personal feature of the user himself or herself.

Entering his or her password is used as the most common means. Moreover, there is a case where a signature pattern is used for identification of the user. In addition, identification methods using the recognition of finger prints, palm prints, hand configurations, retina patterns, voices or the like have been developed as means for identifying the user on a terminal.

As is described above, there have been devised various methods for protecting a PC system against an illegal usage by a user who is originally not authorized to gain access to the system. However, in a case where a password is entered, it has been possible to record passwords illegally used but has been difficult to identify the user.

In order to identify an illegal user, visual information on the external appearance of the user is very useful. As is seen from automated teller machines, a monitor camera is installed in the vicinity of an automated teller machine as a security system for monitoring the machine. However, since this security system has to be installed separately from the machine, a certain cost is involved. Moreover, although visual information can be recorded for monitoring, with such a system, recording is carried out at all times, and therefore, a recording medium of a large capacity is needed.

Due to this, there is caused a problem when such a security system is adopted for the PC system. In particular, with a battery-operated PC system, the operation time of the system is reduced because the battery has to be used as a power source for operating the recording system at all times for recording visual information continuously. Therefore, it is required that the peripheral status of the PC system in operation is easily recorded as image information.

To this end, an object of the present invention is to enable the identification of an illegal user of a PC system while reducing the consumption of the resource for the system. Another object of the present invention is to enable verification using the PC system without using an application program. A further object of the present invention is to enable the setting of image information recording not only from a BIOS setup program but also from an operating system or an application program.

SUMMARY OF THE INVENTION

With a view to attaining the objects, according to one aspect of the present invention, there is provided an electronic apparatus comprising a first memory which stores at least a parameter representing conditions with respect to the illegal usage of the apparatus and a control unit for storing in a second memory image information produced by a photographing device which has photographed a user of the apparatus in the event that the conditions represented by the parameter are established.

Then, the control unit is constructed so as to control the output of the image information stored in the second memory in accordance with an output direction. Furthermore, the control unit is constructed so as to direct a BIOS setup program to read out the parameter stored in the first memory and to record the image information into the second memory. The control unit is further constructed so as to direct an operating system or an application program running on the electronic apparatus to set and modify the parameter stored in the first memory via an interface prepared on the BIOS program.

Additionally, according to the present invention, there is provided a computer readable recording medium having recorded thereon a program for rendering from a computer read out at least the parameter representing conditions with respect to the illegal usage of the electronic apparatus which is stored in the first memory, determining whether or not the conditions are established and stored in the second memory image information produced by the photographing device which has photographed a user who used the apparatus.

BRIEF DESCRIPTION OF THE DRAWINGS

FIG. 2 is a table showing a specific example of a data area that is to be held in a memory, FIGS. 3A to 3C shows a specific example of a software interface prepared by a BIOS setup program, FIG. 10 is a flow chart for image information recording process.

DESCRIPTION OF THE PREFERRED EMBODIMENT

Referring to the accompanying drawings, an embodiment of the present invention will be described. In the description, a PC system will be described as representing an electronic apparatus.

Figure 1:
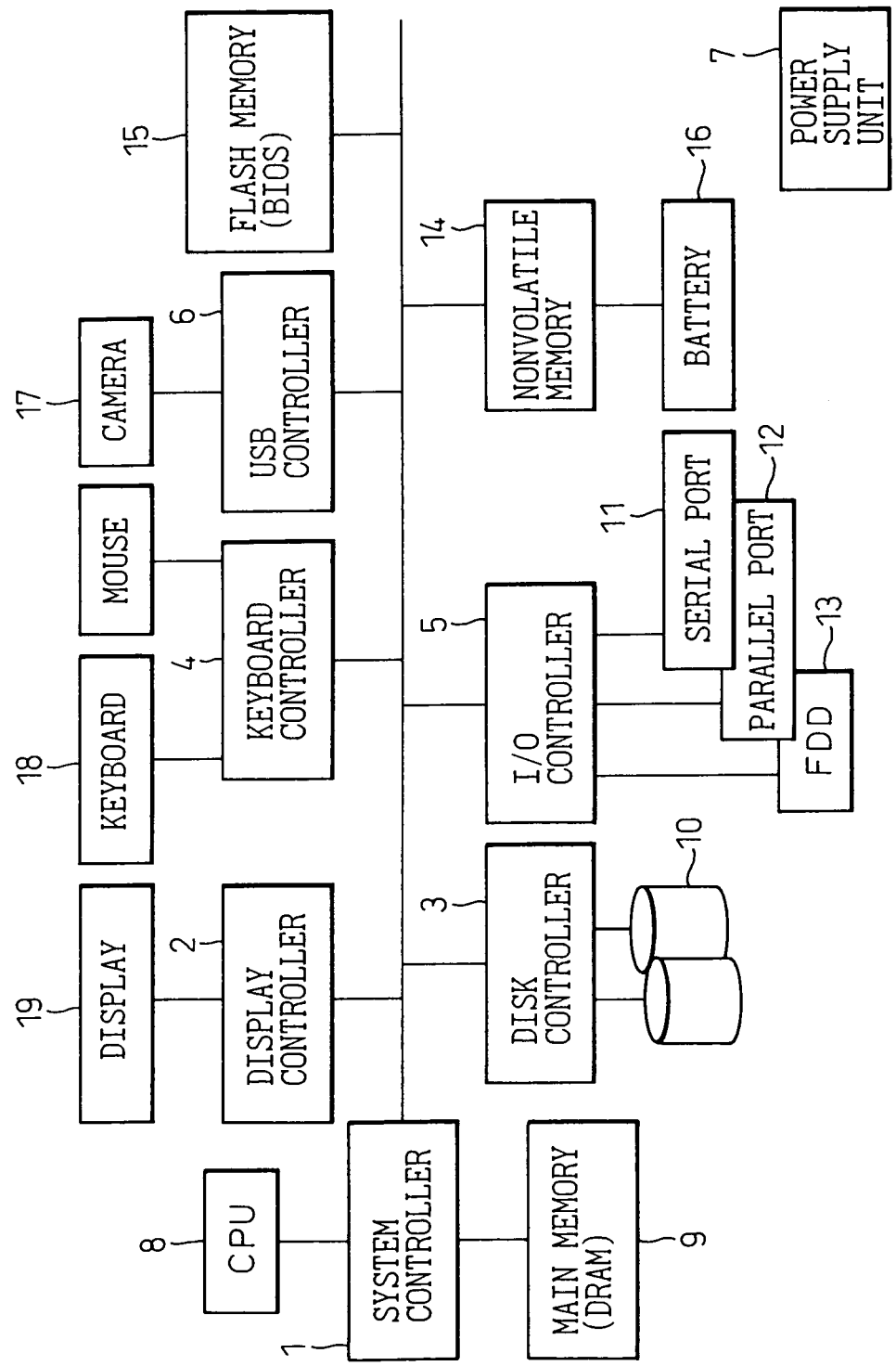
FIG. 1 is a schematic block diagram showing the construction of a personal computer system.

FIG. 1 shows a schematic block structure of a PC system to which an embodiment according to the present invention is applied. The PC system mainly comprises a system controller 1, a display controller 2, a disk controller 3, a keyboard controller 4, an I/O controller 5, and a USB controller 6 which is an interface via which peripherals connect to the PC system, and those constituent devices are connected to each other via a bus. Furthermore, a power supply unit 7 is provided for supplying power to the whole PC system.

The system controller 1 has a CPU 8 and a main memory 9 which is a DRAM, and a hard disk 10 is connected to the disk controller 3. The I/O controller 5 is provided with a serial port 11, a parallel port 12 and a floppy disk drive 13. Connected to the bus are a nonvolatile memory (CMOSRAM) 14 and a flash memory 15 which contains a BIOS, and a backup battery 16 is connected to the nonvolatile memory 14.

Here, the PC system according to the embodiment of the invention is characterized in that a camera 17 is connected to the USB controller 6. For this camera 17 any type of camera such as a CCD camera or a digital camera may be used as long as it can acquire image data in a digital fashion. Then, when a user uses the PC system, it is a common practice that the user faces a display 19 and operates a keyboard 18, and therefore, the orientation of the camera 17 is such that the camera 17 faces the user from the display 19 side, and the camera 17 may be installed at an end portion or the like of the display 19. Note that the camera 17 may be placed away from a PC system main body as long as the camera is installed within a range in which it can reproduce the face or the like of the user and acquire image data.

With a notebook-sized personal computer having a CCD camera built therein, the built-in camera may be used.

To this end, in the embodiment, even in a case where a person who tries to use the PC system is not originally authorized to gain access to the system, when the user activates the PC system, the face of the user is photographed with the camera 17 equipped on the PC system, and the image is designed to be recorded within the PC system. Then, it can easily be determined whether or not the user is a right person who is authorized to gain access to the system (or whether or not the attempted use is illegal) by validating the face of the user by displaying the recorded image on the display 19 of the PC system. In addition, instead of displaying it on the display 19, the recorded image may be printed out.

Photographing the face of the user and recording the photographed image are timed to happen when the power supply is turned on, the BIOS setup program is activated, an illegal password is entered, the system is resumed, or the like.

Data areas are reserved in the nonvolatile memory 14 and the flash memory 15, respectively, so that image information from the camera 17 can be acquired at those timings. A specific example thereof is shown in FIG. 2.

Stored in the nonvolatile memory 14 are the time of recording, a format for image information to be recorded and setting information for controlling the mode of writing image information.

A parameter 1 is intended to control the timing to record image information, and the storage size thereof is 1 byte. The parameter 1 stores data for directing the BIOS program to record image information when the power supply is turned on, the system is resumed, the BIOS setup program is activated, and an illegal password is entered, in response to a value.

A parameter 2 is intended to control a format for image information to be recorded, and the storage size thereof is 1 byte. The parameter 2 stores data for designating to the BIOS program the number of pixels and colors for image information to be recorded, in response to a value.

A parameter 3 is intended to control the mode of writing image information, and the storage size thereof is 1 byte. The parameter 3 stores data for directing the BIOS program to overwrite or append image information, in response to a value.

Then, the flash memory 15 is an area for storing data on image information to be recorded and is adapted to store an image data management header and image data.

The image data management header is management information on image data, and the size thereof is four bytes. The image data management header holds a pointer for the first image data.

Contained in the image data are a pointer for the next image data, time and timing when the image data is recorded, a format for the image data itself and the data thereof.

The size of data can be altered by the format. In a case where the mode of writing is "appending" mode, there will be a plurality of image data. In addition, in order to manage a plurality of image data, individual image data hold pointers for the next image data.

Next, a software interface will be described which directs the BIOS program in accordance with a value set in the nonvolatile memory 14.

FIGS. 3A to 3C show an example of a software interface to be prepared by the BIOS program.

The BIOS program prepares a data structure having a specific signature within a system BIOS area, and an application program is able to know the position of entry points by embedding entry addresses for respective interfaces for 32-bit protected mode.

The application program can execute respective functions by calling entry points it has found with the same calling interface as C language shown in FIGS. 3A to 3C. Prepared for each interface are a function to return the current setting and a function to alter the setting. The BIOS program conducts a return processing or alteration processing of the contents stored in the parameters 1 to 3 within the nonvolatile memory 14 shown in FIG. 2.

Figure 4:
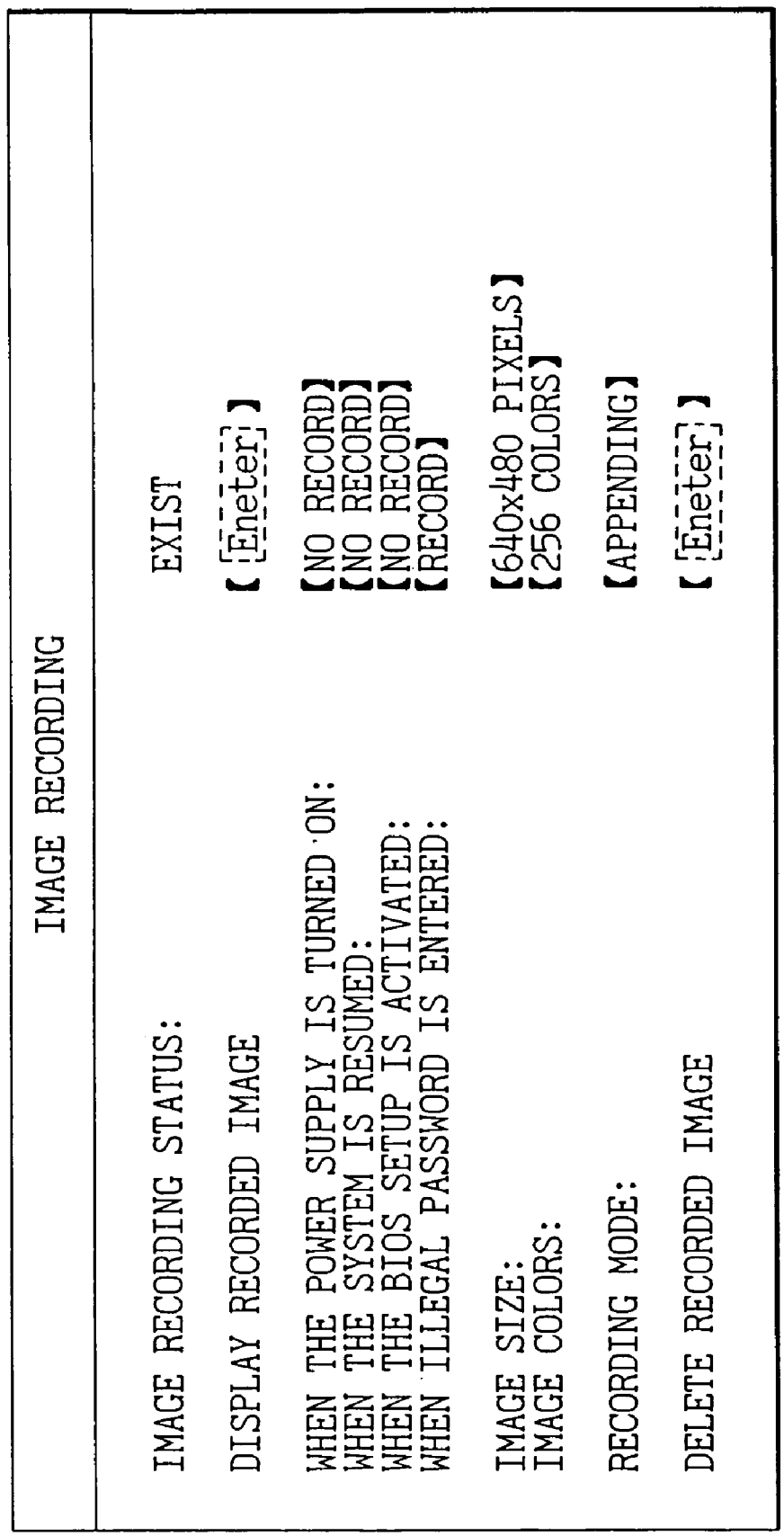
FIG. 4 shows a visual display example of the BIOS setup program.

FIG. 4 shows an example of the visual display of the BIOS setup program.

Timing to record image information can be set at one or a plurality of occasions out of the following four setup items such as "when the power supply is turned on," "when the system is resumed," "when the BIOS setup is activated," and "when an illegal password is entered," and in FIG. 4, it is shown that image information is recorded when a password is illegally entered. These settings are reflected on the parameter 1 in the nonvolatile memory 14.

The "image size," and the "image colors" are items for setting a format for image information to be recorded, and the image size is represented by the number of pixels, which is 640×480, and the image colors is 256. These settings are reflected on the parameter 2 in the nonvolatile memory 14.

The "recording mode" is an item for setting the mode of writing, and in FIG. 4, it is set to "appending" mode. This setting is reflected on the parameter 3 in the nonvolatile memory 14.

Figure 5:
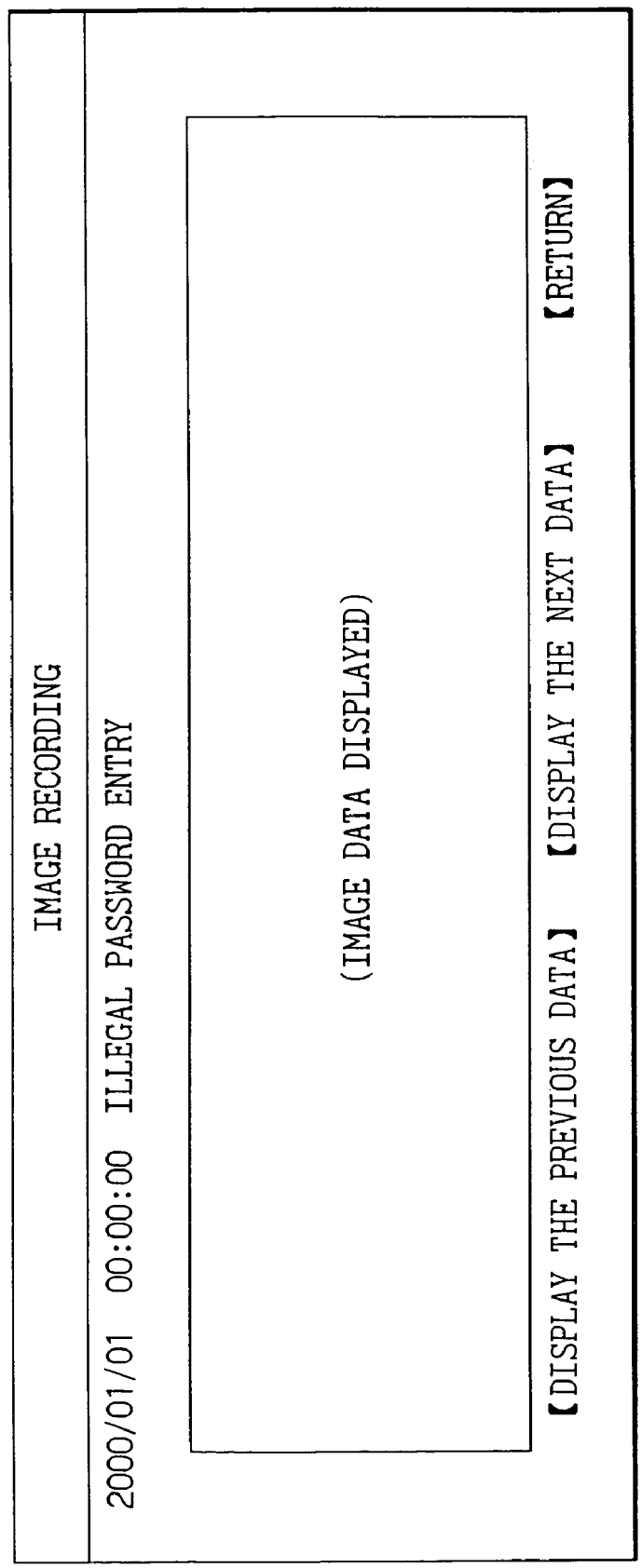
FIG. 5 shows a specific example of a window displaying image recorded information.

The "display recorded image" is intended to display recorded image information in the BIOS setup program. In this item, a recorded image display window as shown in FIG. 5 appears on the display of the PC systems by depressing the enter key on the keyboard 18, where image information is displayed together with the time of recording and timing information.

The "display the previous data" and "display the next data" become selectable when the mode of writing is set to "appending" mode and a plurality of data are recorded, and they can actually be selected by operating the cursor key and enter key. When the "return" is selected, it is possible to return to the display shown in FIG. 4.

The "delete recorded image" is intended to delete recorded image information. In this item, image information is deleted by depressing the enter key.

Next, FIGS. 6 to 9 show processing flows for an entry portion of a recording process of image information. In any case, the BIOS program is designed to obtain the parameter 1 stored in the nonvolatile memory 14, determine whether or not an image recording process is needed, call an image information recording process program when it determines that the recording process is needed.

Figure 6:
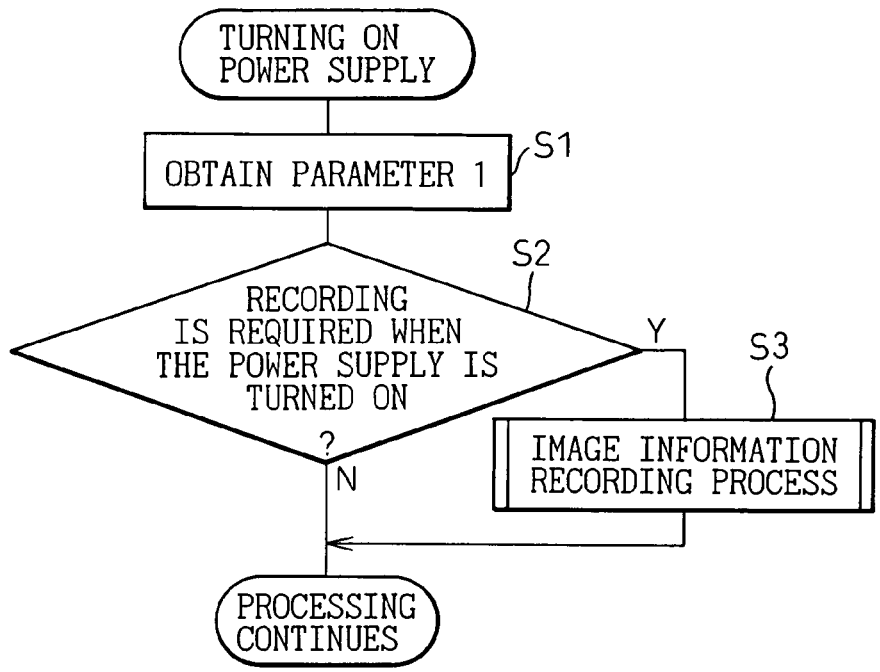
FIG. 6 is a flow chart for processing an entry portion in an image recording process when the power is supplied.

FIG. 6 shows a processing flow at the entry portion in the event that image information is recorded when the power supply turned on. In this case, when the user switches on the power supply with a view to activating the PC system, image information is automatically recorded. Then, the user of the PC system can be verified afterwards by displaying the recorded information on the display.

First of all, when the power supply is turned on with a view to activating the PC system, the BIOS program is activated, and the nonvolatile memory 14 is scanned. When this occurs, the set items on the parameter 1 are read, whereby the parameter 1 is obtained. In the case of the example shown in FIG. 4, in the parameter 1 obtained, the image is set "to be recorded" when an illegal password is entered, and since the image is set "not to be recorded" when the power supply is turned on (step S2), no record is needed (N) when the power supply is turned on, whereby the PC system activating process continues without recording a peripheral image.

Figure 7:
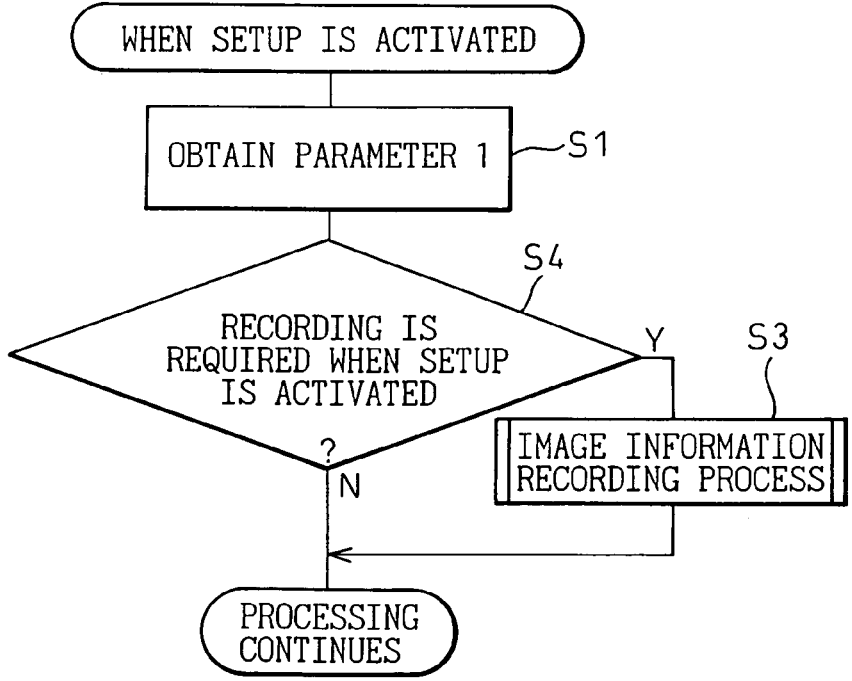
FIG. 7 is a flow chart for processing an entry portion in an image recording process when a setup is activated.

Processing at the time of activation for setup shown in FIG. 7 is similar to the process shown in FIG. 6 which is carried out when the power supply is turned on. In the case of the example shown in FIG. 4, recording is not required at the time of activation for setup (N in step S4), and the PC system activating process continues without recording a peripheral image.

Figure 8:
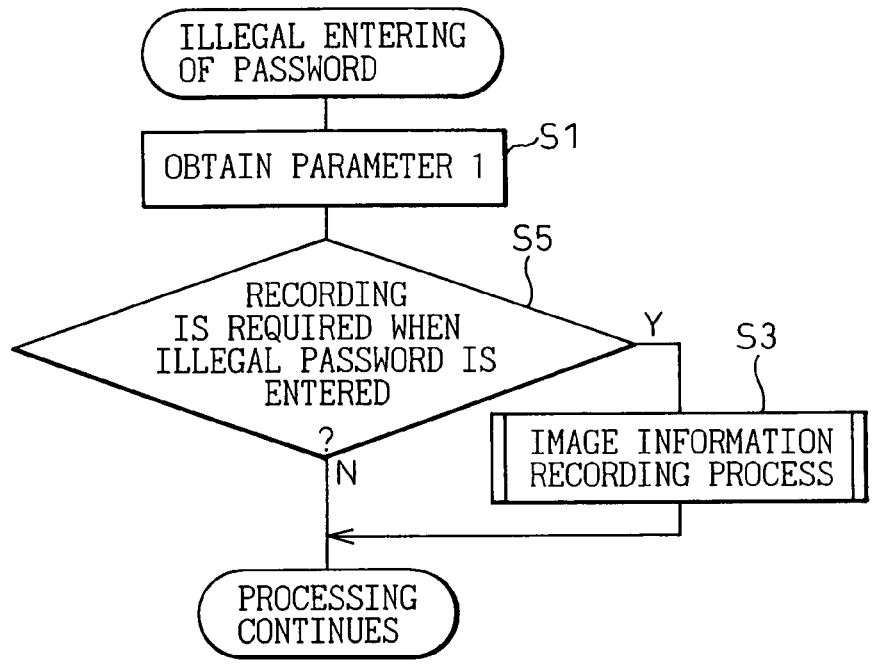
FIG. 8 is a flow chart for processing an entry portion in an image recording process when a password is illegally entered.

FIG. 8 shows a process to be carried out when a password is illegally entered. Obtaining the parameter 1 in step S1 in this case is similar to the process in step S1 shown in FIGS. 6 and 7. In the case of the example shown in FIG. 4, since the image is set "to be recorded" when the password is illegally entered (step S5), it is determined that a peripheral image needs to be recorded (Y), an image information recording process is started (step S3).

Although the image information recording process will be described in detail later on, a peripheral image such as the face of the user is obtained from the camera 17 via the USB controller 6, and the obtained information is recorded in the aforesaid flash memory 15.

Figure 9:
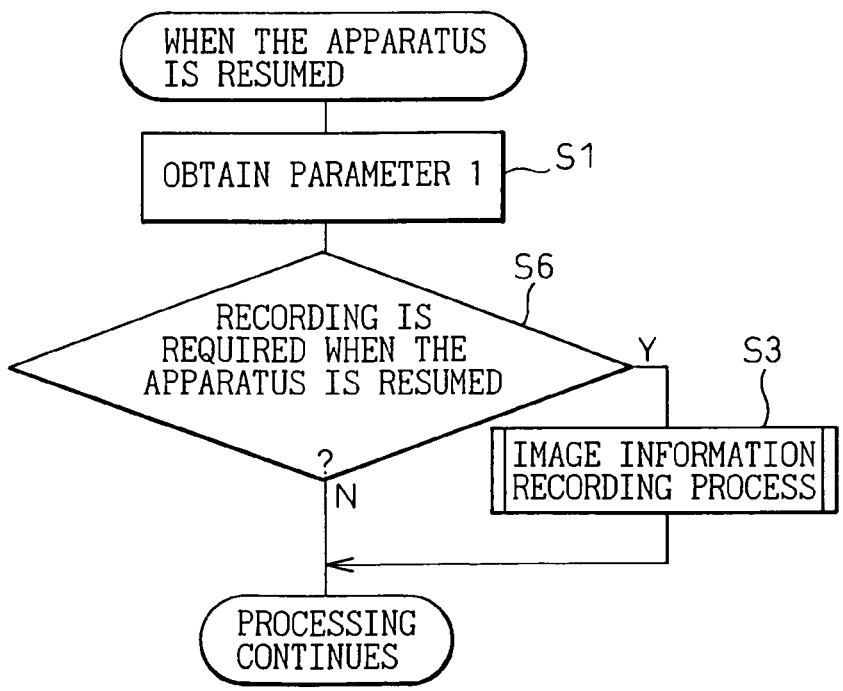
FIG. 9 is a flow chart for processing an entry portion in an image recording process when resumed.

The processes shown in FIGS. 6 to 8 are executed mainly in relation to the setup of the PC system, but apart from that, a peripheral image can also be recorded when the PC system is resumed, as shown in FIG. 9.

A process in step S1 is similar to the process in step S1 shown in FIGS. 6 to 8, respectively. Then, in the event that in the parameter 1 obtained in step S1, the image is set to be recorded when the system is resumed, it is determined that a peripheral image needs to be recorded when the system is resumed (Y), a image information recording process in step S3 is executed. If the case is such as the example shown in FIG. 4, it is determined that no recording is needed (N), the process after the system is resumed continues.

Here, a detailed flow of the image information recording process in step S3 shown in FIGS. 6 to 9 is shown in FIG. 10.

When it is determined that a peripheral image needs to be recorded, first of all, the contents of the format for a peripheral image to be recorded are obtained from the parameter 2 stored in the nonvolatile memory 14 (step S1). In the example shown in FIG. 4, the size of an image and the number of colors of an image are designated, respectively, as the number of pixels of 640×480 and 256 colors. These designations are read out of the parameter 2.

In order to obtain image information in the designated format, the camera 17 is properly controlled and initialized from the system controller 1 via the USB controller 6 (step S12).

When the initialization of the camera 17 is completed, the camera 17 is directed to capture image information (step S13). When the image information has been captured, the photographed image information inside the camera 17 is read out on the main memory 8 to be captured.

Image data is prepared based on the obtained image information and is then stored in the flash memory 15 (step S14). The time and timing of recording and format information are stored on the image data together. Additionally, the image data is compressed as required.

Here, the parameter 3 stored in the nonvolatile memory 14 is obtained (step S15). In this step, the mode of writing the prepared image data is read out, and whether or not the writing mode is designated as "appending" is checked (step S16).

As with the example shown in FIG. 4, in the event that the recording mode is set as "appending" mode (Y), the newly prepared image data is inserted at the front of the image data already recorded. This is implemented by storing a pointer stored in the pointer for the leading image data of the management header in a pointer for the next image data stored in the image data at the time of insertion (step S17).

Then, the pointer for the leading image data of the image data management header is altered by replacing the pointer for the leading image data with the pointer for the newly prepared image data (step S20).

On the other hand, in step S16, in the event that it is determined that the writing mode on the parameter 3 is designated as "overwriting" mode (N), 0 is stored in the pointer for the next image data stored in the prepared image data (step S18). Here, 0 denotes that there is no following data.

At this point, the image data is deleted which is pointed by the pointer for the leading image data of the management header (step S18). After the image data is deleted, as in the case with "appending" mode, the flow advances to step S20, the pointer for the leading image data of the management header is replaced by the pointer for the newly prepared image data.

As has been described heretofore, according to the present invention, the peripheral image is designed to be automatically obtained through the camera provided in the vicinity of the PC system so as to be recorded in the memory at the timing or timings selected from the timings when the power supply associated with the PC system is turned on, when the BIOS setup program is activated, when an illegal password is entered, and when the system is resumed.

Note that in the flow for the image information recording process shown in FIG. 10, in step S12, the camera is initialized in accordance with the parameters stored in the nonvolatile memory, and thereafter in step S13, the camera is directed to capture image information.

However, in a case where the present invention is carried out using a camera of the type in which an image is sent to a PC in a real-time manner, a parameter corresponding to the format for the image sent out from the camera may be designed to be stored in advance in the nonvolatile memory.

Then, it may be configured such that a capturing process of the image being sent out of the camera is executed instead of the initialization process of the camera in step S12 and the directing process of the camera to capture the image information into the camera in step S13. Image signals being sent out are recorded in the memory as a still image in accordance with the recording timing of the parameters. Additionally, it is also possible to have the image information photographed by the camera retained temporally for a certain period of time, so that a still image of the retained image information is captured in the PC in accordance with the recording timing of the parameters.

Thus, the peripheral image information photographed by the camera is automatically captured in the PC.

Note that apart from the aforesaid recording timings, the recording timing of peripheral image information may be set to an optional recording timing determined by the user authorized to access the system. For example, peripheral image information is captured at certain time intervals.

Additionally, in the embodiment above, while the image data of the peripheral image information is designed to be stored in the flash memory used by the BIOS program, in a case where the memory capacity becomes low due to the additional peripheral image information, a flash memory of a large capacity may be used. The peripheral image information may be stored in another nonvolatile memory. In addition, a volatile memory fed by a backup battery may be used.

Furthermore, while in the embodiment the separate recording devices are used for the nonvolatile memory for recording the recording timing and the flash memory for recording image data, it may be configured such that a single recording device is shared.

With the configuration according to the present invention, the security countermeasures against theft and illegal access by recording peripheral image information including the user are information useful for identification of the user who illegally used the system. In addition, the application of the present invention is not limited to the PC system as disclosed in the embodiment but the invention may be applied to any other types of electronic apparatuses.

Moreover, since there is no need to prepare a specific operating system and application program in order to record peripheral image information including the user, the use and service for maintenance of the apparatus can be eased.

Furthermore, the configuration parameter for the recording (ex. the recording mode) can be set at an application program level utilizing a GUI on the operating system with which the user is familiar. This will ease the system management like a remote maintenance or the like.

According to the present invention, since the peripheral image information surrounding the user is recorded only when an illegal use of the system is identified, there is no risk of the resource of the apparatus being wasted purposelessly. Additionally, the operation of the apparatus can be simplified such that the recorded peripheral image information can be validated without using a specific operating system and application program, and that the configuration parameters for the recording of peripheral image information can be set from not only the BIOS setup program but also the operating system or the application program.

What is claimed is:

1. An electronic apparatus having a display, comprising:
    a photographic device acquiring image information of a user that operated the electronic apparatus;
    a first memory, provided within said electronic apparatus, storing therein parameters which are set by a user authorized to access said electronic apparatus and representing conditions at which said image information is to be acquired, wherein said conditions include when a power supply for said electronic apparatus is turned ON, when a BIOS setup program installed in said electronic apparatus is activated, when said electronic apparatus is resumed, and when an illegal password is entered in said electronic apparatus, wherein an image information acquiring format and writing mode are selected, set and stored in said first memory;
    a second memory, provided within said electronic apparatus, storing image information acquired by said photographing device;
    a control unit reading out said parameters from said first memory when a user operates said electronic apparatus, directing acquisition of image information by said photographic device when one or more of said conditions represented by the read parameters are established, and storing, in said second memory, the acquired image information; and
    an input unit for designating to display said image information stored in said second memory, by said authorized user, wherein said control unit causes the acquired image information to be read out from said second memory and then displayed on said display in accordance with the received input.

2. An electronic apparatus as set forth in claim 1, wherein said control unit directs a BIOS setup program to read out said parameters in said first memory and to record said image information in said second memory.

3. An electronic apparatus as set forth in claim 2, wherein said control unit directs an operating system or an application program running on said electronic apparatus to set and alter said parameters in said first memory via an interface prepared on said BIOS setup program.

4. An electronic apparatus as set forth in claim 2, wherein said control unit directs said BIOS setup program to output said image information recorded in said second memory through said operating system or said application program.

5. An electronic apparatus as set forth in claim 1, wherein an image data management header, a recording time, a recording timing, a recording format and image data related to said image information are recorded in said second memory.

6. An electronic apparatus as set forth in claim 1, wherein the mode of writing said image data into said second memory is of an overwriting or an appending mode.

7. A computer readable recording medium having a program recorded therein readable by a computer to execute:
    reading out parameters from a first memory provided in an apparatus having said computer, the parameters being set by a user authorized to access said apparatus and representing conditions at which image information of a user that operated the apparatus is to be acquired, wherein said conditions include when a power supply for said apparatus is turned ON, when a BIOS setup program installed in said apparatus is activated, when said apparatus is resumed, and when an illegal password is entered in said apparatus;
    determining the establishment of one or more of said conditions;
    selecting, setting and storing recording timing, a format and a writing mode, for each of the conditions;
    acquiring image information from a photographing device which photographs a user that operated said apparatus, when said one or more of said conditions are established;
    storing the acquired image information in a second memory provided within said apparatus; and
    displaying said image information, read out from said second memory, on a display of said apparatus, when said authorized user designates said computer to display said stored information.

8. A recording medium as set forth in claim 7 having stored therein a program for controlling the output of said image information stored in said second memory in accordance with an output direction.

9. A recording medium as set forth in claim 7 having stored therein a program for directing a BIOS setup program to read out said parameters in said first memory and to record said image information in said second memory.

10. A recording medium as set forth in claim 9 having stored therein a program for directing an operating system or an application program, running on said apparatus, to set and alter said parameters in said first memory via an interface prepared on said BIOS setup program.

11. A recording medium as set forth in claim 9 having stored therein a program for directing said BIOS setup program to output said image information recorded in said second memory through said operating system or said application program.

12. A recording medium as set forth in claim 9 having stored therein a program for recording in said second memory a image data management header, a recording time, a recording timing, a recording format and image data related said image information.

13. A recording medium as set forth in claim 9 having stored therein a program wherein the mode of writing said image data into said second memory is of an overwriting or an appending mode.

14. An image information control method, comprising
reading out parameters from a first memory provided within an apparatus, the parameters being set by a user authorized to access said apparatus and representing conditions at which image information of a user that operated the apparatus is to be acquired, wherein said conditions include when a power supply for said apparatus is turned ON, when a BIOS setup program installed in said apparatus is activated, when said apparatus is resumed, and when an illegal password is entered in said apparatus;
wherein a format and a writing mode, each representing conditions for obtaining image information, are selected, set and stored in said first memory;
determining the establishment of one or more of said conditions;
acquiring image information from a photographing device which photographs a user of said apparatus, when said one or more of said conditions are established;
storing the acquired image information in a second memory provided within said apparatus;
reading out said image information from said second memory, when said authorized user designates the apparatus to display said stored information; and
displaying said read out image information on a display of said apparatus.

15. An image information control method as set forth in claim 14, wherein a BIOS setup program is directed to read out said parameters in said first memory and to record said image information in said second memory.

16. An image information control method as set forth in claim 15, wherein an operating system or an application program running on said apparatus is directed to set and alter said parameters in said first memory via an interface prepared on said BIOS setup program.

17. An image information control method as set forth in claim 15, wherein said BIOS setup program is directed to output said image information stored in said second memory through said operating system or said application program.

18. An image information control method as set forth in claim 14, wherein a image data management header, a recording time, a recording timing, a recording format and image data related to said image information are recorded in said second memory.

19. An image information control method as set forth in claim 14, wherein the mode of writing said image data into said second memory is of an overwriting or an appending mode.

20. An electronic apparatus as set forth in claim 1, wherein the first and second memories are different types of memories.

* * * * *